United States Patent
Newman et al.

(10) Patent No.: US 11,438,122 B2
(45) Date of Patent: Sep. 6, 2022

(54) CUSTOM DOWNLINK SEARCH-SPACES FOR LOW-COMPLEXITY 5G/6G MESSAGING

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: Ultralogic 6G, LLC, Palos Verdes Estates, CA (US)

( * ) Notice: Subject to any disclaimer, the term of this patent is extended or adjusted under 35 U.S.C. 154(b) by 0 days.

(21) Appl. No.: 17/580,929

(22) Filed: Jan. 21, 2022

(65) Prior Publication Data

US 2022/0159688 A1 May 19, 2022

Related U.S. Application Data

(60) Provisional application No. 63/210,216, filed on Jun. 14, 2021, provisional application No. 63/214,489, filed on Jun. 24, 2021, provisional application No. 63/220,669, filed on Jul. 12, 2021, provisional application No. 63/234,911, filed on Aug. 19, 2021, provisional application No. 63/254,357, filed on Oct. 11, 2021, provisional application No. 63/272,352, filed on Oct. 27, 2021, provisional application No.
(Continued)

(51) Int. Cl.
*H04L 5/00* (2006.01)
*H04W 72/04* (2009.01)
*H04W 72/12* (2009.01)

(52) U.S. Cl.
CPC ......... *H04L 5/0051* (2013.01); *H04L 5/0053* (2013.01); *H04W 72/042* (2013.01); *H04W 72/0446* (2013.01); *H04W 72/0453* (2013.01); *H04W 72/1273* (2013.01)

(58) Field of Classification Search
CPC .......... H04W 72/1273; H04W 72/042; H04W 72/0446; H04W 72/0453; H04W 74/046; H04W 36/08; H04W 28/04
See application file for complete search history.

(56) References Cited

U.S. PATENT DOCUMENTS

2018/0302889 A1* 10/2018 Guo .................... H04W 72/046
2018/0352500 A1 12/2018 Baldemair
2018/0352601 A1* 12/2018 Park .................. H04W 72/1242
(Continued)

*Primary Examiner* — Chi Ho A Lee
(74) *Attorney, Agent, or Firm* — Mayer & Williams PC

(57) ABSTRACT

Low-complexity message formats and procedures are disclosed, greatly simplifying the task of user devices in recognizing downlink messages in 5G/6G. A user device, not requiring high performance or low latency, may request a "custom search-space" in which downlink messages may be transmitted by the base station, thereby greatly reducing the calculation overhead of the user device. In addition, message formats are disclosed that may enable rapid identification of relevant messages, and rejection of other messages, without performing a "blind search" and other arduous procedures. In addition, messaging protocols are disclosed that may avoid unnecessary control signaling, thereby saving time and energy. Low-cost wireless devices may be enabled by such low-complexity options in future wireless networks.

18 Claims, 5 Drawing Sheets

Related U.S. Application Data

63/283,649, filed on Nov. 29, 2021, provisional application No. 63/285,627, filed on Dec. 3, 2021.

(56) References Cited

U.S. PATENT DOCUMENTS

| | | |
|---|---|---|
| 2019/0104503 A1 | 4/2019 | Niu |
| 2019/0191434 A1 | 6/2019 | Hugl |
| 2019/0342777 A1 | 11/2019 | Tiirola |
| 2020/0106566 A1* | 4/2020 | Yeo ........................ H04W 28/04 |
| 2020/0214018 A1* | 7/2020 | Venugopal .......... H04W 72/085 |
| 2020/0229168 A1 | 7/2020 | Chen |
| 2020/0260420 A1 | 8/2020 | Blankenship |
| 2020/0344792 A1* | 10/2020 | Liu ........................ H04W 72/04 |
| 2020/0351867 A1* | 11/2020 | Guo ................. H04W 72/0446 |
| 2021/0014861 A1* | 1/2021 | Wang ............... H04W 72/0446 |
| 2021/0112583 A1 | 4/2021 | Gao |
| 2021/0120560 A1 | 4/2021 | Kutz |
| 2021/0127283 A1* | 4/2021 | Si .......................... H04W 24/08 |
| 2021/0136771 A1 | 5/2021 | Xu |
| 2021/0143953 A1 | 5/2021 | Parkvall |
| 2021/0160828 A1 | 5/2021 | Taherzadeh |
| 2021/0168781 A1 | 6/2021 | Lee |
| 2021/0168782 A1 | 6/2021 | Hamidi-Sepehr |
| 2021/0185651 A1 | 6/2021 | Seo |
| 2021/0195579 A1 | 6/2021 | Lei |
| 2021/0235247 A1 | 7/2021 | Lee |
| 2021/0266909 A1* | 8/2021 | Lin ................... H04W 72/0493 |
| 2021/0274562 A1* | 9/2021 | Takeda .............. H04W 74/0833 |
| 2021/0306682 A1* | 9/2021 | Ucar ..................... H04W 4/029 |
| 2021/0345342 A1* | 11/2021 | Sakhnini ........... H04W 72/0493 |
| 2021/0360523 A1 | 11/2021 | Hwang |
| 2022/0086894 A1* | 3/2022 | Papasakellariou ........................ H04W 72/1289 |

\* cited by examiner

CUSTOM DOWNLINK SEARCH-SPACES FOR LOW-COMPLEXITY 5G/6G MESSAGING

PRIORITY CLAIMS AND RELATED APPLICATIONS

This application claims the benefit of U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/234,911, entitled "Short Demodulation Reference for Improved Reception in 5G", filed Aug. 19, 2021, and U.S. Provisional Patent Application Ser. No. 63/254,357, entitled "Low-Complexity Downlink, Uplink, and Sidelink Messaging in 5G", filed Oct. 11, 2021, and U.S. Provisional Patent Application Ser. No. 63/272,352, entitled "Sidelink V2V, V2X, and Low-Complexity IoT Communications in 5G and 6G", filed Oct. 27, 2021, and U.S. Provisional Patent Application Ser. No. 63/283,649, entitled "Downlink Demarcations for Rapid, Reliable 5G/6G Messaging", filed Nov. 29, 2021, and U.S. Provisional Patent Application Ser. No. 63/285,627, entitled "Custom Downlink Search-Spaces for Low-Complexity 5G/6G Messaging", filed Dec. 3, 2021, all of which are hereby incorporated by reference in their entireties.

FIELD OF THE INVENTION

Protocols are disclosed for low-complexity 5G and 6G communications, and particularly for low-complexity downlink messaging.

BACKGROUND OF THE INVENTION

In 5G and 6G, detecting a downlink control message is a complex process. The user device is required to perform an arduous and time-consuming search across many "candidate" message possibilities across a wide range of time, frequency, length, and configuration variables, and must test each one of those possible combinations to find out if there is a message addressed to the user node. Downlink data messages also involve complex and uncertain protocols. Many, if not most, future wireless applications are expected to rely on single-purpose devices such as sensors and actuators, which are typically tightly cost-constrained. Such single-task devices typically have very low communication demands. Low-cost processors such as microcontrollers may struggle to keep up with these search demands. In addition, the wasted power may drain battery-powered systems sooner than necessary. What is needed is a low-complexity protocol for user nodes to recognize messages intended for them.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is non-transitory computer-readable media in a base station of a wireless network, the base station in signal communication with a user device, the media comprising instructions that, when executed by a computing environment, cause a method to be performed, the method comprising: receiving, from the user device, a request for a custom search-space; assigning, to the user device, the custom search-space; and transmitting, to the user device, starting in the custom search-space, a downlink data message; wherein: the custom search-space comprises a particular resource element having a particular subcarrier and a particular symbol time relative to a slot boundary of a resource grid managed by the base station; the downlink data message comprises a plurality of modulated message resource elements including a first modulated message resource element; and the first modulated message resource element is transmitted in the particular resource element according to the particular subcarrier and the particular symbol time.

In another aspect, there is a user device in signal communication with a base station of a wireless network, the user device configured to: transmit, to the base station, a request for a custom search-space; receive, from the base station, a custom search-space assignment specifying a particular subcarrier and a particular symbol time, the particular subcarrier and the particular symbol time together comprising the custom search-space; and receive, or attempt to receive, a downlink data message comprising a plurality of modulated message resource elements, the downlink data message comprising a first modulated message resource element, the first message resource element being transmitted on the particular subcarrier and at the particular symbol time.

In another aspect, there is a method for a base station of a wireless network to provide a custom search-space for a user device, the user device in signal communication with the base station, the method comprising: receiving, from the user device, a request message requesting that the custom search-space be provided; transmitting, to the user device, an assignment message assigning one or more resource elements to the custom search-space, each of the one or more resource elements comprising a particular subcarrier and a particular symbol time of a resource grid, respectively; and transmitting, to the user device, a downlink data message comprising a first message resource element, wherein the first message resource element is transmitted in the custom search-space.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1:
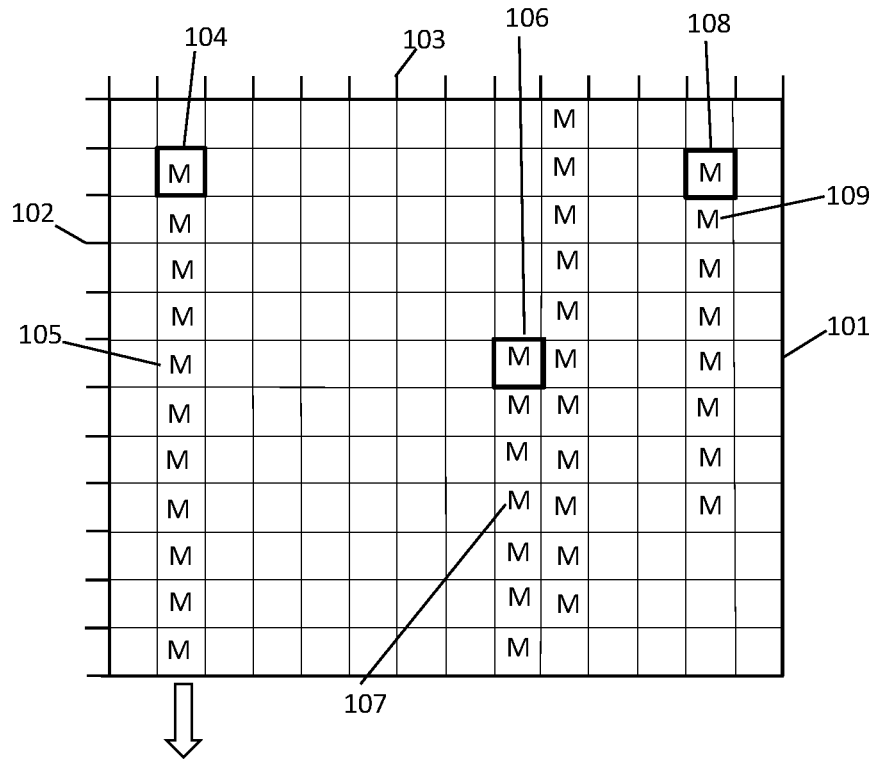
FIG. 1 is a schematic showing an exemplary embodiment of a resource grid including messages, according to some embodiments.

Disclosed herein are systems and methods for rapid low-complexity downlink messaging with high reliability in 5G and 6G networks. Systems and methods disclosed herein (the "systems" and "methods", also occasionally termed "embodiments", "versions", or "arrangements", generally according to present principles) can provide urgently needed wireless communication protocols to reduce computational demands, energy consumption, message loss, retransmission delays, and uncertainty in downlink messaging in 5G and 6G networks, according to some embodiments. The protocols may also be applicable to uplink and sidelink and other types of messages. The protocols may include requesting, by a user device, a custom small "search-space", or region of a resource grid. The base station then sends downlink messages to that user device, with the first resource element of each message beginning in the custom search-space. The user device can thereby recognize its downlink messages since they begin only within that custom search-space. Hence, the user device may avoid performing a blind search, and the number of calculations and tests that the user device must perform may be greatly reduced, thereby reducing the chance of message faults, simplifying receiver software, and saving substantial computational power, while avoiding unnecessary delays such as retransmission delays, according to some embodiments. In addition, the user device can request that the downlink control messages and/or its regular downlink data messages include an indication of the length of the message, early in each message, to assist the user device in locating the extent of each message. In addition, the user device can request that the base station include the user device's identification code early in each message, so that the user device can recognize the message as being intended for it. In addition, the user device can implicitly acknowledge that these accommodations may result in longer delays and slower communications due to the extra bits to be transferred and the extra constraints upon the scheduler. However, many reduced-capability devices and applications do not require low latency, and such a trade-off may be acceptable, or even enabling, in a cost-constrained use case.

Terms herein generally follow 3GPP (third generation partnership project) standards, with additional terms defined as needed. A wireless network generally includes a base station (or gNB, generation Node B, eNB, evolved Node B, AP, access point, or the like) in signal communication with a plurality of user devices (or UE, user equipment, terminals, user nodes, or the like). 5G and 6G technologies are designed for eMBB (enhanced Mobile Broadband communications), URLLC (ultra reliable low latency communications), and mMTC (massive machine-type communication) generally involving large numbers of user devices such as vehicles, mobile phones, self-propelled and robotic machines, portable and stationary computers, and many other advanced wireless instruments. "5G" represents fifth-generation wireless technology and "6G" sixth-generation wireless technology. "NB-IoT" (narrow-band Internet-of-things) and "5G-Light" are versions that provide slightly reduced complexity and bandwidth requirements. A network (or cell or LAN Local Area Network or RAN Radio Access Network or the like) may include a base station in signal communication with a plurality of user devices and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period", and a specific frequency and bandwidth termed a "subcarrier" (or "subchannel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also "resource element groups" or "REG" or "channels" in references) including 12 subcarriers. The "numerology" of a resource grid corresponds to the subcarrier spacing in the frequency domain. Each subcarrier is at a slightly different frequency. Subcarrier spacings of 15, 30, 60, 120, and 240 kHz are defined in various numerologies. Each subcarrier can be independently modulated to convey message information. Thus a resource element, spanning a single symbol period in time and a single subcarrier or subchannel in frequency, is the smallest unit of a message. A message is "unicast" if it is addressed to a specific recipient, and "broadcast" if it includes no recipient address. Communication in 5G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user nodes, among other channels that may be in use. In addition, one or more random access channels, termed "RACH" herein, also called PRACH in references, represents both abstract and physical random access channels, including potentially multiple random access channels in a single cell, and configured for uplink and/or downlink, as detailed below. "CRC" (cyclic redundancy code) is an error-detection code. "RNTI" (radio network temporary identity) such as "C-RNTI" (cellular RNTI) are network-assigned user identification codes. "MAC" (media access control) is a global identification code. "DMRS" (demodulation reference signal) is a standard demodulation reference. A "DCI" (downlink control information) message is a message transmitted from a base station to a user device indicating a scheduled uplink grant or downlink transmission, among other tasks.

In addition, the following terms are defined herein. Each modulated resource element of a message is referred to as a "modulated message resource element", or more concisely as a "message element" in examples below, thereby avoiding confusion with ambiguous terms such as "symbol". Likewise, each resource element of a demodulation reference is a "reference element" herein. A "start" of a message refers to the first or starting resource element of the message, and the "end" of a message refers to the last or ending resource element of the message. A message may be configured "time-spanning" if it occupies multiple sequential symbol periods at a single frequency, or "frequency-spanning" if it occupies multiple subcarriers at a single symbol period (thereby avoiding terms "TDD" time-division duplexing and "FDD" frequency-division duplexing, which properly refer to duplexing). A message may be arranged "frequency-first" if the message elements proceed across multiple subcarriers until reaching a limit, such as a resource block boundary, and then proceeding to the next symbol period. A device "knows" something if it has the relevant information. A message is "faulted" or "corrupted" if one or more bits of the message are altered relative to the original message. "Receiver" is to be interpreted broadly, as including connected processors and other electronics and related software/firmware configured to receive and process incoming wireless messages. "Random" and "pseudorandom" may be used interchangeably. "Low-complexity" refers to devices and procedures necessary for wireless communication, exclusive of devices and procedures that provide high-performance communication. 5G/6G specifications include many procedures and requirements that greatly exceed those necessary for wireless communication, in order to provide high-performance communications at low latency and high reliability for users that demand it. Compared to high-performance 5G/6G communications, low-complexity procedures generally require less computation and less signal processing, while providing defaults that involve fewer computation steps and/or smaller memory spaces. "Reduced-capability" refers to wireless devices that cannot comply with 5G/6G protocols, absent the systems and methods disclosed herein. Many future IoT (internet of things) use cases are expected to involve simple, low-cost, reduced-capability MTC (machine-type communication) wireless devices. In addition, task-specific low-cost wireless applications typically have minimal wireless communication needs. Because both high-performance and reduced-capability devices share the same limited electromagnetic spectrum, it would be tragic if the simpler machine-type applications are forced to develop a separate wireless technology, competing with 5G and 6G for bandwidth and locations. A much more efficient solution is to include simpler protocols and defaults appropriate to the low-cost, low-demand MTC devices. For economic reasons as well as commercial feasibility, future IoT application developers will demand ways to transmit messages using protocols appropriate to the simpler devices.

The following examples illustrate low-complexity downlink messaging options including user-requested custom search-spaces, custom messaging formats with user identification and message length explicitly indicated, and other options.

FIG. 1 is a schematic showing an exemplary embodiment of a resource grid including messages, according to some embodiments. As depicted in this non-limiting example, a portion of a resource grid 101 is shown with horizontal lines 102 demarking subcarriers and vertical lines 103 demarking symbol times, thereby defining resource elements, of which one resource element is shown as a darker square 104. The grid portion shown 101 includes one RB (resource block) of 12 subcarriers 102 and one slot of 14 symbol times 103. Three messages are depicted as "M". A first message 105 starts in a particular resource element 104 and is frequency-spanning. The first message 105 may continue beyond the bottom of the figure into the next resource block, as indicated by an arrow, if the subsequent resource block is allocated for downlink messages; otherwise, the message may continue in the next symbol time. The particular resource element 104 may be a custom search-space assigned by the base station to the user device. The base station may transmit the message 105 starting in the custom search-space 104 as shown, to assist the user device in finding its messages. Thus the user device can monitor the particular resource element 104 in each slot (or other periodicity), readily detecting messages intended for that user device, and may thereby avoid the need to test large numbers of candidate messages across a wide region of the resource grid 101. Reduced-capability user devices may be able to receive messages more readily, knowing that the messages will start in a particular resource element 104, and may thereby avoid expending the time and energy required for an extensive blind search. As used herein, a message "begins" or "starts" at a custom search-space if the first resource element of the message occurs in that custom search-space.

Also shown is a second custom search-space 106, and a second message 107 beginning in the custom search space 106. The second message 107 is restricted to the frequency range of the depicted RB, and therefore "wraps" when it reaches the last subcarrier of the RB and continues in the next symbol time. Also shown is a third custom search-space 108, in which a third message 109 starts.

The first custom search-space 104 is defined by a particular subcarrier and a particular symbol time, which in this case is the second subcarrier and the second symbol time of the slot. Downlink control signals such as DCI, and other messages on the downlink control channel PDCCH, may appear in the second symbol time, whereas the other two messages 107, 109 are in a region often used for data messages on the shared downlink channel PDSCH. However, the separation of downlink control and data messages is generally not rigid, and a base station is free to transmit a control message to a user device in any of the symbol times. Therefore, when requesting a custom search space, a user device may request, and receive, both its control messages and its data messages with the starting message element in the same custom search-space, such as a single resource element in each slot (or other periodicity). This use of a highly restricted starting location of each downlink message intended for the user device, may simplify the task of the receiver since only a single resource element, or other small area of the resource grid, need be monitored.

In general, downlink search-spaces are operational only for resource elements that are scheduled for downlink or are unscheduled. If a resource element is scheduled for uplink, then the base station cannot transmit in that resource element. Therefore the custom search-space does not apply to uplink scheduled regions.

In some embodiments, a user device may request just a single resource element as its custom search-space, and may request that both control and data messages (PDCCH and PDSCH messages) be transmitted to that user device starting in the assigned custom search-space. The rest of the message may continue in the adjoining resource elements; thus the custom search-space only applies to the first message element. An advantage of requesting a single resource element as a custom search-space may be to enable the user device to receive its various downlink messages by monitoring just a single resource element, which may greatly simplify operations for a reduced-capability device. On the other hand, the messages may be delayed due to scheduling conflicts, especially in heavy traffic. If the user device's application does not require low latency, as many do not, then such delays may be of no consequence.

Figure 2:
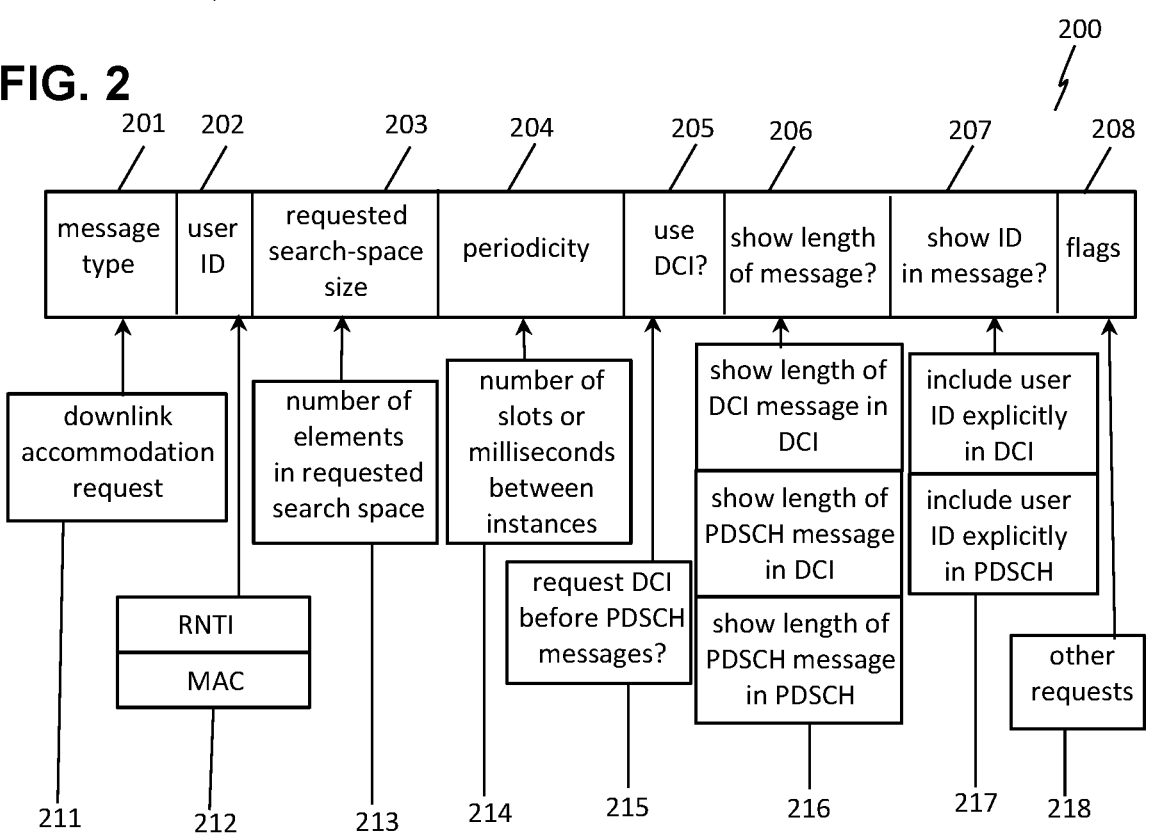
FIG. 2 is a schematic showing an exemplary embodiment of a request message requesting a custom search-space and specifying parameters, according to some embodiments.

FIG. 2 is a schematic showing an exemplary embodiment of a request message transmitted by a user device to a base station, requesting a custom search-space and specifying parameters, according to some embodiments. As depicted in this non-limiting example, a downlink accommodation request message 200 may include a number of fields, all optional. For example, the request message 200 may include a "message type" field 201 which may indicate that the message is a downlink "accommodation" request 211, that is, a request for the base station to accommodate the user device's limitations by using low-complexity protocols. The request message 200 may include the user device's identification 202, which may be its C-RNTI or other RNTI or its MAC address 212, depending on when in the initial access procedure the request message is transmitted. The request message 200 may include a size field 203 indicating the size of the custom search-space, such as indicating the number of resource elements to be included in the custom search-space 213. In some embodiments, the requested custom search-space includes only one resource element in a slot, that is, a particular subcarrier and a particular symbol time, to be repeated in each slot or other periodicity. The request message 200 may include a periodicity field 204 indicating how many slots or milliseconds or other measure of interval 214 is to be placed between instances of the custom search-space. For example, if the user device needs fast delivery of downlink messages, the periodicity may be set to 1 slot, so that the custom search-space occurs in every slot. Alternatively, if the user device is planning to "sleep" or become idle between downlink opportunities, the user device may specify that downlink messages occur only once per four slots or ten milliseconds or other value, for example. The request message 200 may include a field indicating use of a DCI 205, such as requesting that the base station does or does not transmit a DCI message to the user device before transmitting a PUSCH data message to that user device. For example, the base station may transmit a DCI control message to the user device first, and then may follow with the data message subsequently (after a predetermined delay). However, in some embodiments (described below), the control message DCI may be unnecessary. Therefore, the request message 200 may indicate 215 whether the user device requires such a DCI warning message before receiving a data message.

The request message 200 may also include a length field 206 regarding displaying the length of the message in various ways. The user device may save time and energy by knowing how long a particular downlink message is before receiving it. The user device can then extract the particular resource elements of the downlink message, and begin interpreting the downlink message, without blind-searching to determine its length. In the depicted request message 200, the length field 206 may include various options 216. For example, the user device may request that any DCI messages intended for that user device should include an indication of the length of the DCI message, preferably early in the DCI message, so that the user device can extract the resource elements of its DCI message without performing a blind search to determine the message length. Another option is for the base station to indicate, in the DCI message, the length of the planned data message, which may assist the user device in receiving the data message. As a further option, the user device can request that the planned data message include, or be concatenated with, an indication of the length of the data message, which is preferably placed before the data message, or early in the data message. In each case, the length information may help the receiver in receiving the control and/or data messages.

The request message 200 may also include an ID option field 207 that indicates whether the identification code of the user device should appear, explicitly, in the DCI message and/or in the data message 217. Placing the ID code early in each downlink message may greatly assist reduced-capability user devices in determining which messages belong to them. The ID code may be in plain text (not scrambled, encoded, rate-matched, interleaved, or other manipulation), for ease of recognizing the code. Alternatively, the ID code may be scrambled with the user device's C-RNTI and the user device can search for the predetermined bit-pattern accordingly. However, the utility of scrambling an ID code with an ID code may be questionable. Finally, a "flags" field 208 may include additional features or accommodation 218 that the user device requires, as well as reserved bits for future additional features.

The user device, in requesting a custom search-space, may implicitly accept that its messages may be delayed due to the extra scheduling constraint, and that users demanding high-performance communications would generally not request such accommodations.

Figure 3A:
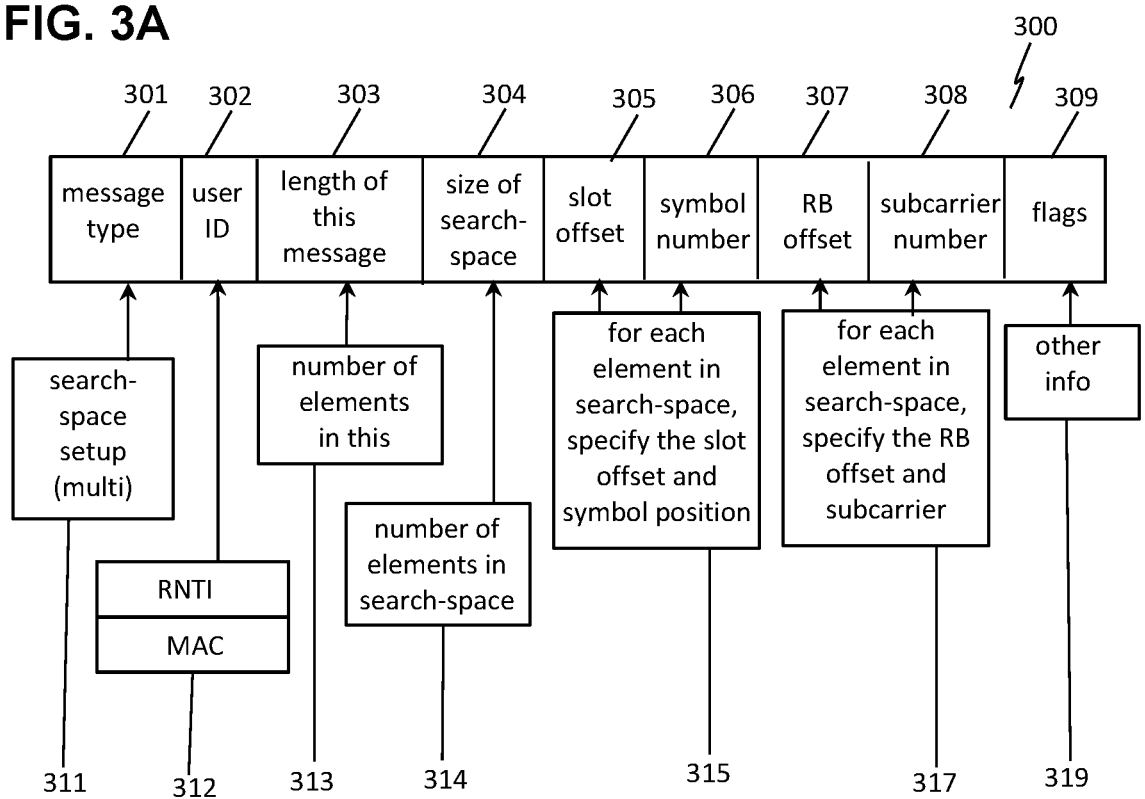
FIG. 3A is a schematic showing an exemplary embodiment of an assignment message specifying a custom search-space, according to some embodiments.

FIG. 3A is a schematic showing an exemplary embodiment of an assignment message transmitted by a base station to a user device, specifying a custom search-space for the user device, according to some embodiments. As depicted in this non-limiting example, an assignment message 300, transmitted by a base station responsive to a request message (such as that of FIG. 2), may provide the user device with custom search-spaces, which may be a single resource element or multiple resource elements. The assignment message 300 may include a message type field 301 which may indicate that the message type is a custom search-space assignment message 311 for user devices requesting one or more resource elements for non-exclusive use in receiving downlink messages. The downlink messages then begin within the custom search space. The assignment message 300 may include the ID code 302 of the user device, such as its MAC or RNTI codes 312, depending on when in the initial access process the information is provided. The assignment message 300 may also include a size field 303 which indicates how long the assignment message 300 is, in bits or bytes or message resource elements or other units 313. The current size information may assist the user device in receiving the assignment message 300.

The assignment message 300 may also indicate the size of the search-space 304, such as the number of resource elements in the custom search space 314. The assignment message 300 may include a slot offset 305 which is the number of slots 315 after a DCI message or a frame boundary that the user device can expect to receive a downlink data message, thereby giving the user device sufficient time to prepare for receiving the data message. The slot offset can also indicate a periodicity, such as a number of slots between instances of the custom search-space. The assignment message 300 may include a symbol number 306 within a slot, thereby indicating which symbol time in the slot corresponds to the custom search-space element. The assignment message 300 may also include a "RB" (resource block) offset 307, which indicates the number of resource blocks 317 between the DCI (or other fixed frequency) and the custom search-space element. The message may further include a subcarrier number 308 within that resource block. If the user device requested multiple resource elements for its custom search space, the assignment message 300 may include multiple copies of the last four fields 305, 306, 307, 308 one for each of the resource elements in the assigned custom search-space. The elements of the custom search space may be contiguous or separate, in various embodiments. Finally, the assignment message 300 may include a number of flags 309 settable according to other features not mentioned 319, or reserved for future uses. As mentioned, all fields are optional. The base station may inform the user device of the location and properties of the user device's custom search-space resource elements, by transmitting an assignment message such as that depicted, or the like.

Figure 3B:
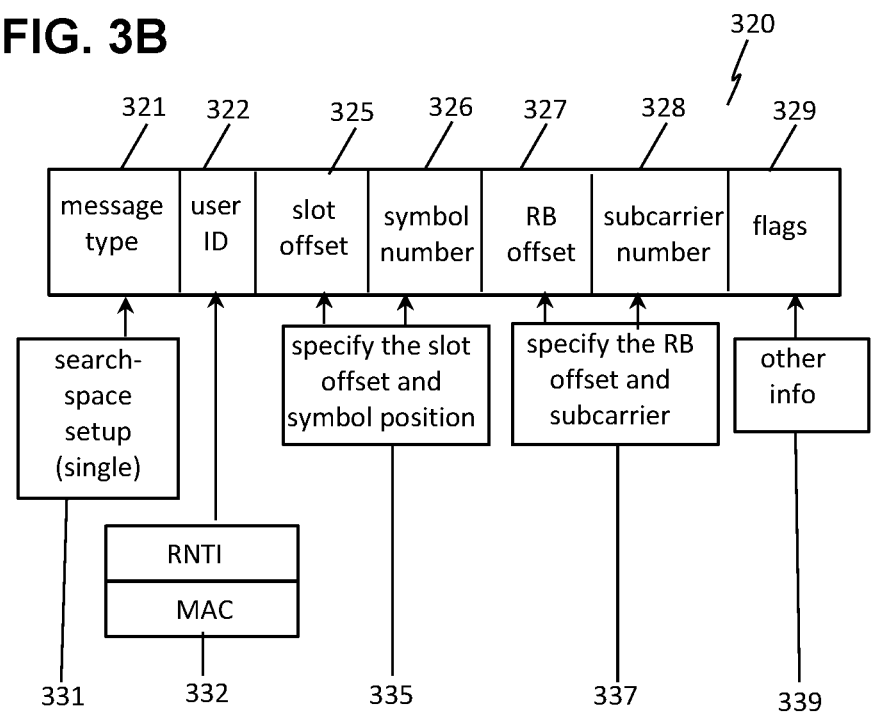
FIG. 3B is a schematic showing an exemplary embodiment of a short-form assignment message specifying a custom search-space, according to some embodiments.

FIG. 3B is a schematic showing an exemplary embodiment of a short-form assignment message specifying a custom search-space, according to some embodiments. As depicted in this non-limiting example, a short-form assignment message 320 may be used by a base station to inform a user device of its custom search-space consisting of just one resource element. The message 320 may include a message-type field 321 indicating that it is a single-element custom search-space assignment message 331, and a user ID field 322 with the user device's RNTI or MAC code 332. The message 320 may then specify the slot offset 325, and the symbol number 326 within the slot, thereby determining the timing 335 of the one resource element. The message 320 may also include an RB offset 327 and a subcarrier number 328, thereby determining the frequency 337 of the custom search-space element. The message 320 may include flags 329 containing further information 339 that the user device may need.

Figure 4A:
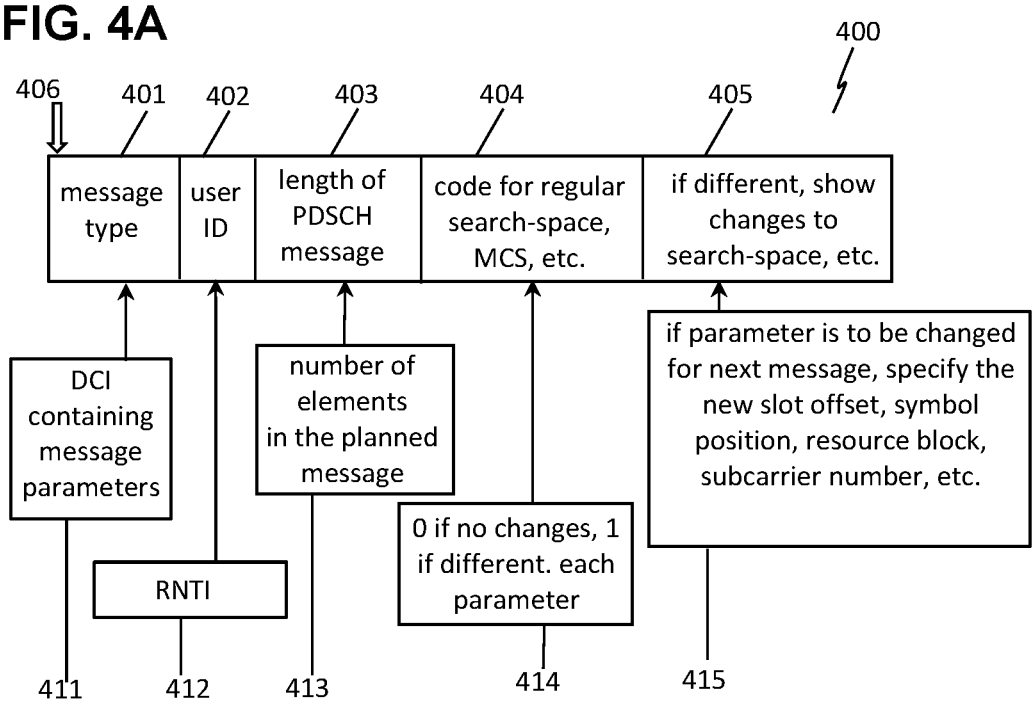
FIG. 4A is a schematic showing an exemplary embodiment of a DCI message starting in a custom search-space and specifying the length of an imminent PDSCH message, according to some embodiments.

FIG. 4A is a schematic showing an exemplary embodiment of a DCI message starting in a custom search-space and specifying the length of an imminent PDSCH message, according to some embodiments. As depicted in this non-limiting example, a DCI message 400 transmitted by a base station to a user device, may inform the user device of an imminent PDSCH data message, which the base station may transmit upon the next custom search-space, or other slot delay as requested by the user device. The DCI message 400 may include a message type field 401 indicating that the message is a DCI specifying parameters 411 of the subsequent data message. The DCI message 400 may start in the first resource element 406 of the custom search space, as indicated by an arrow. Since the user device is expecting to receive downlink messages that start in the user device's custom search-space, the user device may thereby detect the DCI message 400.

If the user device requested that the user device's ID code appear early in the downlink messages, then the DCI message 400 may include a user ID field 402, which usually holds an identification code of the user device, such as its C-RNTI 412. In addition, if the user device requested that the length of the planned PDSCH data message be displayed in the DCI message 400, then the DCI message 400 may include a length field 403 indicating the number of elements 413 in the planned data message.

The DCI message 400 may also include a parameter field 404, indicating whether the data message is to be transmitted in the custom search-space as assigned, or if the data message is to begin in some other resource element. For example, one or more of the custom search-space parameters may have changed, for this next data message only, as indicated in a code. For example, a code of "0000" may indicate "no change", meaning that the previously assigned slot offset, symbol number, RB offset, and subcarrier number will be used, whereas a "1" at each position indicates "one-time parameter change" when there is a change 414. Additional bits may be added to indicate whether other parameters, such as the MCS (modulation and coding scheme), are to remain as previously set up or altered for one data message, in the same way. If any of those parameters is to be changed for the PUSCH downlink message, then a final field 405 may be added showing the updated values 415.

Figure 4B:
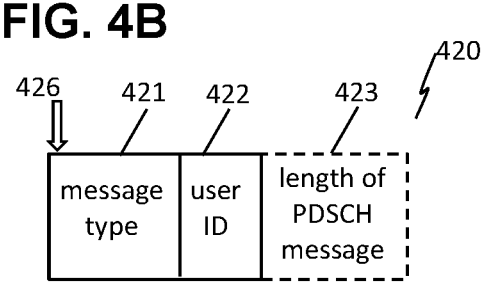
FIG. 4B is a schematic showing an exemplary embodiment of a short-form DCI message starting in a custom search-space and specifying the length of an imminent PDSCH message, according to some embodiments.

FIG. 4B is a schematic showing an exemplary embodiment of a short-form DCI message starting in a custom search-space and specifying the length of an imminent PDSCH message, according to some embodiments. In most cases, a data message is to be downloaded using the previously agreed parameters, and the change message of FIG. 4A would not be needed. Instead, as depicted in this non-limiting example, a short-form DCI 420 may be sufficient to inform the user device of the imminent download. The short-form DCI message 420 may begin in the custom search-space of the user device as indicated by an arrow 426, and may include a message-type field 421 indicating that it is a DCI alerting the user device of a coming data message, and the user device's identification code 422. Optionally, in dash, the base station can indicate the length of the data message 423, if requested by the user device. In some embodiments, the data message is then transmitted in the next instance of the custom search-space, and the user device knows when and how to receive it. In some embodiments, the data message may be transmitted in the second subsequent custom search-space, if some kind of interruption occurs. If the user device still has not received the data message after two instances (or some predetermined number) of the custom search-space, the user device may request a retransmission by transmitting a NACK to the base station.

In some embodiments, an even shorter DCI may include only the user ID 422, without the message type field 421 or the length field 423. For example, a default or convention may be established that a downlink message of the user device's C-RNTI code may indicate that a data message for that user device is to be transmitted in the next one or two (or other number) of instances of the custom search-space, without further explanation required under most circumstances. Then the user device, monitoring the custom search-space, may receive the short DCI including only the user's ID, and then receive the data message on the next instance of the custom search-space. This may reduce the amount of messaging involved and simplify reception for reduced-capability devices.

An advantage of transmitting the control and data messages on subsequent instances of the custom search-space may be that, for each type of DCI message disclosed above, the user device can readily receive the data message after the DCI message, because they both begin in the same custom search-space. Therefore, the user device does not need to change frequencies or do anything to receive the data message, other than continue to monitor its selected custom search-space as usual.

Figure 4C:
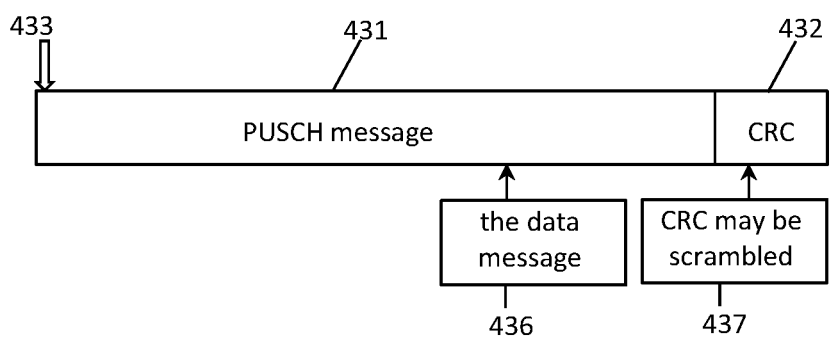
FIG. 4C is a schematic showing an exemplary embodiment of the PDSCH message of FIG. 4A starting in the custom search-space, according to some embodiments.

FIG. 4C is a schematic showing an exemplary embodiment of the PDSCH data message starting in the custom search-space, according to some embodiments. As depicted in this non-limiting example, the data message 431 may be transmitted following the DCI message such as that of FIG. 4A or 4B. The data message 431 may include just the PDSCH message 436 which includes a CRC field 432 which may be scrambled with the user device's C-RNTI code 437. Importantly, however, the first element 433 of the data message is shown in the custom search space of the user device, as indicated by an arrow. Since the PDSCH data message 431 starts in the expected custom search-space, the user device may detect the message without performing a blind search. For example, the user device may already know that the PDSCH data message 431 is intended for itself because the DCI message, indicating the impending transmission, also mentioned the user device's ID code 422, which thereby affirms that the data message 431 is intended for that user device. In addition, the user device may already know the size of the PDSCH data message 431, from the DCI message which specified the size in field 403, for example. The user device, already having determined from the DCI message, that it is the intended recipient of the data message 431, and already knowing the length of the data message 431, may then readily extract the PDSCH data message from the radio stream, without performing a blind search.

In some embodiments, the user device may receive downlink data messages of a single size only. For example, a simple sensor or actuator may be configured to respond to a limited set of commands, each command being transmitted in a downlink data message of a particular size. In that case, there is no need to indicate the length of the data message in the DCI or the data message or elsewhere, since the user device already knows it. Use of a standard size of downlink messages, where feasible, may simplify the transmission and reception, as desired. However, if for some unusual circumstance a longer downlink message is required, then for that message the base station may transmit a DCI message specifying the length, and the user device may thereby be alerted to receive the longer format data message.

In addition, the example includes a CRC field 422 embedded in the data message 421. If the DRD 422 is scrambled (which may be unnecessary if the user device's identification was specified in the DCI), the user device may unscramble the CRC 422 and thereby determine whether the data message 421 is corrupted. If the data message 421 is corrupted, the user device may attempt to recover it by various techniques, such as modulation analysis and/or AI modeling, among others. It may be noted that such error correction would not be possible if the CRC were used for recipient identification, because the user device would not know whether the data message 421 is corrupted or intended for another user. In addition, if the intended recipient is already specified in, for example, the DCI message, then the CRC is used only for error detection, and not for identification of the recipient. In that case, scrambling provides little or no benefit. Therefore, when the user device's ID is specified in the DCI or early in the data message, the CRC 432 may be provided in plain-text. The size of the CRC was increased from 16 to 24 bits to account for the loss of selectivity when the CRC is used for both error detection and recipient identification. If the CRC were used only for error detection, as envisioned in this example, then the CRC may be restored to the original 16-bit length, or even shorter. The reduction of 8 bits in the CRC may partially offset the extra messaging involved in the ID and optional size fields 422, 423 of the DCI message.

In other embodiments, the user device may decline to receive DCI messages (related to imminent downlink data messages), in which case the user device can check each downlink message that begins in the custom search-space, blind-search only to determine the size of the data message (if not provided in plain-text early in the data message), and thereby receive the data message while using only minimal processing energy. In other embodiments, the user device may be configured to receive data messages of a predetermined size only, and therefore may recognize its downlink data messages when they occur in its custom search-space without searching for the length. In still other embodiments, the end of the data message may be demarcated by one or more resource elements containing no signal, in which case the user device can demodulate and interpret the intervening resource elements to receive the message.

Figure 5A:
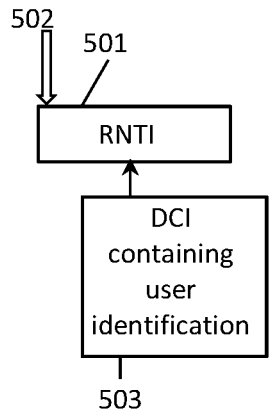
FIG. 5A is a schematic showing an exemplary embodiment of a DCI message starting in a custom search-space and specifying the user device's identification, according to some embodiments.

FIG. 5A is a schematic showing an exemplary embodiment of a DCI message starting in a custom search-space and specifying the user device's identification, according to some embodiments. As depicted in this non-limiting example, a short-form DCI message 501 includes just the C-RNTI (16 bits) 502 of the user device. The first element 502 of the message 501 begins on the custom search-space of the user device, as indicated by an arrow. The user device, upon receiving the short-form DCI message 501, may thereby determine that the message 501 includes that user device's ID code in the user device's custom search-space 503, which thereby indicates that a PUSCH data message will be transmitted after the predetermined number of slots and symbol times. Since the custom search-space parameters have previously been established, and there are no changes in the predetermined MCS (modulation and coding) and timing parameters, the ID code may itself be a sufficient DCI message to warn the user device that its PDSCH data message is forthcoming upon the next instance of the custom search-space resource element (or other delay as requested by the user device).

Figure 5B:
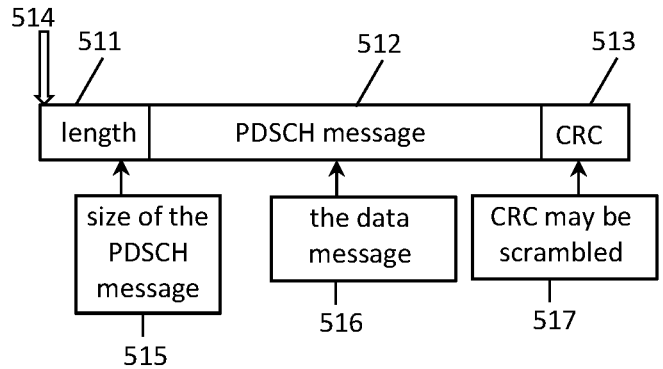
FIG. 5B is a schematic showing an exemplary embodiment of the PDSCH message of FIG. 5A starting in the custom search-space, according to some embodiments.

FIG. 5B is a schematic showing an exemplary embodiment of the PDSCH data message referred to by the DCI of FIG. 5A, according to some embodiments. As depicted in this non-limiting example, the PDSCH data message 512, starting in the custom search-space, is the message that the short-form DCI 501 refers to. The message 512 may include, or be concatenated with, a length field 511 that indicates the size of the data message 515. The length field 511 starts in the custom search-space as indicated by an arrow 514, enabling the user device to recognize the message and receive it. The prepended length field 511 may indicate how long the PDSCH data message is 515, or the length of the entire transmission, depending on convention. Following the length field 511 is the PDSCH data message itself 512, 516, which includes a CRC field 513 embedded or appended to the message, and may or may not be scrambled 517. In this example, no blind search is involved. Since the user device has already determined, from the DCI message, that the transmission is intended for that user device, the CRC 513 has no identification function, and therefore serves as an error-detection code only. Any transmission errors due to noise and interference may be revealed by the CRC 513. In some cases, messaging faults may be mitigated instead of requesting a retransmission, thereby saving time and resources.

Figure 6A:
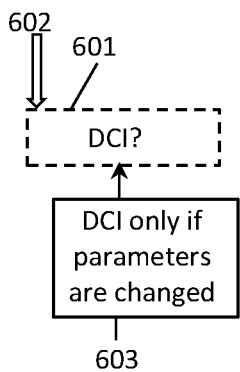
FIG. 6A is a schematic showing an exemplary embodiment of an optional DCI message starting in a custom search-space, according to some embodiments.

FIG. 6A is a schematic showing an exemplary embodiment of an optional DCI message starting in a custom search-space, according to some embodiments. As depicted in this non-limiting example, the DCI message 601 is omitted, as indicated in dash, unless one of the downlink parameters has changed 603. If a downlink data message is to be transmitted with parameters changed, for that transmission only, then the DCI message may provide that information. In that case, the informative DCI may start in the custom search-space 602 as indicated by an arrow. In most cases, however, there are no parameter changes, so the DCI 601 may be omitted. An advantage of omitting an unnecessary DCI message may be saving time and energy, and reducing electromagnetic backgrounds, especially in heavy traffic conditions.

Figure 6B:
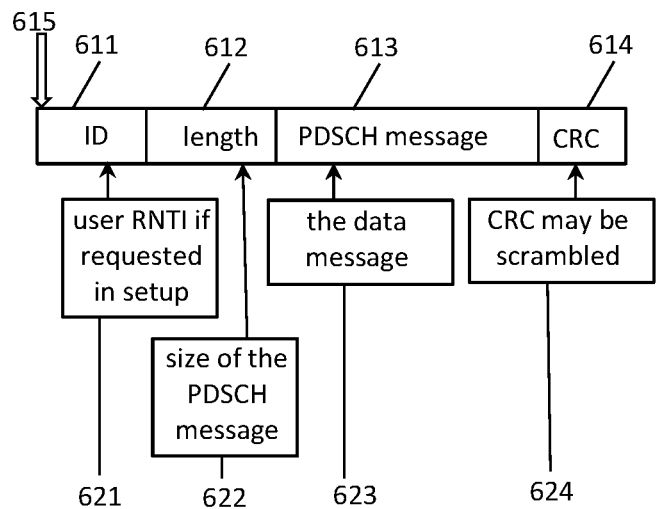
FIG. 6B is a schematic showing an exemplary embodiment of the PDSCH message starting in the custom search-space and including length and identification fields, according to some embodiments.

FIG. 6B is a schematic showing an exemplary embodiment of the PDSCH data message starting in the custom search-space and including length and identification fields, according to some embodiments. As depicted in this non-limiting example, the data message 613 may not need a DCI warning, because the information that the user device needs may be included in the PDSCH transmission itself. In the example, an identification field 611 may be concatenated with the data message 613 and the other fields, and may start 615 in the user device's custom search-space as indicated by an arrow. In this case, the identification code is the RNTI code 621 of the user device, which indicates that the associated data message 613 is intended for that user device. A length field 612 may be included, indicating the size 622 of the concatenated data message 613, if requested by the user device. Then the data message 613 itself is transmitted 623, which may include the CRC field 614, which may or may not be scrambled 624. The user device may detect the message by monitoring its custom search-space, and may detect its own identification code 611 (thereby determining that the message is intended for it), and may detect the length field 612 (thereby determining the extent of the rest of the message), and then may demodulate the PDSCH message itself 613, and may use the embedded CRC 614 as an error-detection tool instead of an identification test. The user device may thereby obtain the message, and also determine whether the message contains a correctable fault, without performing a blind search, and (in this case) without requiring an unnecessary DCI message. In addition, the original 16-bit CRC may be sufficient for error detection since the CRC only does one job. The reduced size of the CRC, and the avoided DCI message, may partially or completely offset the bits used in the ID and length fields 611, 612.

Figure 7:
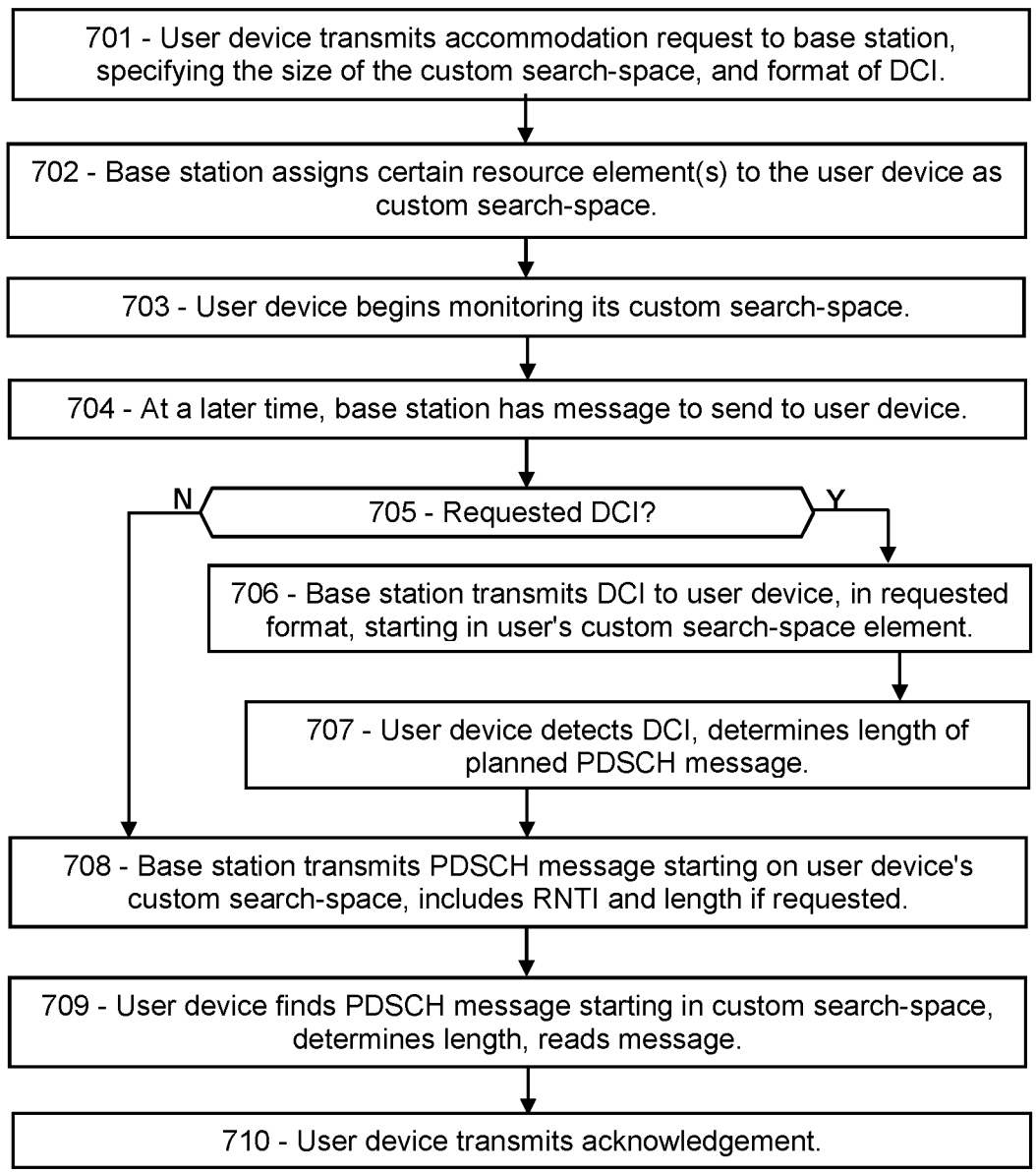
FIG. 7 is a flowchart showing an exemplary embodiment of procedure for transmitting and receiving downlink messages starting in custom search-spaces, according to some embodiments.

FIG. 7 is a flowchart showing an exemplary embodiment of a procedure for transmitting and receiving downlink messages starting in custom search-spaces, according to some embodiments. As depicted in this non-limiting example, at 701, a user device may transmit an accommodation request message to the base station, requesting a custom search-space of, for example, a single resource element, and specifying fields of the DCI and/or PDSCH messages, as discussed above. At 702, the base station assigns a certain resource element to the user device (non-exclusively), and the user device can expect to receive its downlink messages starting on that custom search-space. In this case, the same resource element is to be used for both PDCCH and PDSCH messages (that is, control and data messages). The base station transmits this information to the user device in an assignment message.

At 703, the user device begins monitoring its assigned custom search-space for downlink messages. At 704, the base station has a message to send to the user device, but first at 705 the base station determines whether the user device has requested a DCI message in advance of each PDSCH data message. If so, the base station transmits 706 the DCI message according to the user device's formatting request, which in this case includes indicating the length of the planned PDSCH message. At 707, the user device receives the DCI message which starts at the user device's custom search-space. The DCI message includes the ID code of the user device and the length of the planned data message. The user device then, at 708, receives the PDSCH data message, starting at the user device's custom search-space as requested. The user device uses the length information to determine the extent of the data message for ease of extracting the data message without performing a blind search.

If, on the other hand, the user device had requested not to receive DCI messages at 705, then the base station would have transmitted the user device's identification code and, optionally, the length information, concatenated with the data message at 708. In either case, using the length information, the user device may extract the data message and interpret it at 709. Then, after using the CRC to verify that the message is unfaulted, the user device transmits an acknowledgement to the base station at 710.

Thus the user device has obtained the message and verified it without performing a blind search, and in addition can attempt a fault recovery if the CRC indicates that it is faulted, thereby saving time and energy, and avoiding a retransmission with its additional delays and resource usage.

To summarize, a user device can request that downlink communication be configured in a low-complexity format wherein each downlink message may begin in a custom search-space, which may be a particular element of the resource grid. The message may have other features that the user device requests such as identification and length data. The base station may assign the custom search-space as requested, and then may transmit downlink messages starting in the custom search-space as requested, thereby allowing the user device to find messages that are intended for it without performing a blind search and other steps involved in identifying each of its downlink messages. Reduced-capability devices and IoT applications with simple communication needs may be enabled by avoiding the arduous and energy-consuming search procedures generally required, absent the systems and methods disclosed herein.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. Non-transitory computer-readable media in a base station of a wireless network, the base station in signal communication with a user device, the media comprising instructions that, when executed by a computing environment, cause a method to be performed, the method comprising:
   a. receiving, from the user device, a request for a custom search-space;
   b. assigning, to the user device, the custom search-space; and
   c. transmitting, to the user device, starting in the custom search-space, a downlink data message; wherein:
   d. the custom search-space comprises a particular resource element having a particular subcarrier and a particular symbol time relative to a slot boundary of a resource grid managed by the base station;
   e. the downlink data message comprises a plurality of modulated message resource elements including a first modulated message resource element and f the first modulated message resource element is transmitted in the particular resource element according to the particular subcarrier and the particular symbol time;
   g. determining, according to the request for the custom search-space, whether the user device requests or declines a downlink control information message, the downlink control information message being transmitted prior to transmission of the downlink data message;
   h. if the user device requests the downlink control information message, then transmitting the downlink control information message prior to transmitting the downlink data message; and
   i. if the user device declines the downlink control information message, then transmitting the downlink data message without transmitting the downlink control information message.

2. The media of claim 1, wherein the request for a custom search-space and the downlink data message are transmitted according to 5G or 6G technology.

3. The media of claim 1, the method further comprising transmitting, to the user device, a search-space assignment message indicating at least the particular subcarrier and the particular symbol time.

4. The media of claim 1, the method further comprising transmitting, to the user device, a downlink control information message indicating that the downlink data message is to be transmitted.

5. The media of claim 4, wherein the downlink control information message is transmitted, at least in part, in the custom search-space.

6. The media of claim 4, wherein the downlink control information message indicates an identification code of the user device and a size or length of the downlink control information message.

7. The media of claim 4, wherein the downlink control information message indicates a size or length of the downlink data message.

8. The media of claim 1, wherein the downlink data message indicates an identification code of the user device.

9. The media of claim 1, wherein the downlink data message indicates a size or length of the downlink data message.

10. The media of claim 1, wherein the downlink control information message:
   a. includes an identification code of the user device;
   b. does not include an indication of the custom search-space; and
   c. does not include an indication of a size or length of the downlink data message.

11. Non-transitory computer-readable media in a base station of a wireless network, the base station in signal communication with a user device, the media comprising instructions that, when executed by a computing environment, cause a method to be performed, the method comprising:
   a. receiving, from the user device, a request for a custom search-space;
   b. assigning, to the user device, the custom search-space; and
   c. transmitting, to the user device, starting in the custom search-space, a downlink data message; wherein:
   d. the custom search-space comprises a particular resource element having a particular subcarrier and a particular symbol time relative to a slot boundary of a resource grid managed by the base station;
   e. the downlink data message comprises a plurality of modulated message resource elements including a first modulated message resource element wherein
   f. the first modulated message resource element is transmitted in the particular resource element according to the particular subcarrier and the particular symbol time; and
   g. determining, according to the request for the custom search-space, whether the user device requests that an identification code of the user device be transmitted in a downlink control information message, the downlink control information message being transmitted prior to transmitting the downlink data message.

12. The media of claim 11, the method further comprising determining, according to the request for the custom search-space, whether the user device requests that an identification code of the user device be transmitted in the downlink data message.

13. A wireless transceiver in a user device of a wireless network, the user device in signal communication with a base station of the wireless network, the wireless transceiver configured to:
   a. transmit, to the base station, a request for a custom search-space;
   b. receive, from the base station, a custom search-space assignment specifying a particular subcarrier and a particular symbol time, the particular subcarrier and the particular symbol time together comprising the custom search-space; and
   c. receive, or attempt to receive, a downlink data message comprising a plurality of modulated message resource elements, the downlink data message comprising a first modulated message resource element, the first message resource element being transmitted on the particular subcarrier and at the particular symbol time;
   d. wherein the request for the custom search-space specifies whether an identification code of the user device is to be included in a downlink control information message, and whether the identification code of the user device is to be included in the downlink data message.

14. The wireless transceiver of claim 13, wherein the request for the custom search-space specifies how many resource elements comprise the custom search-space.

15. The wireless transceiver of claim 13, wherein the request for the custom search-space specifies whether the base station is to transmit a downlink control information message to the user device before transmitting the downlink data message.

16. A method for a base station of a wireless network to provide a custom search-space for a user device, the user device in signal communication with the base station, the method comprising:
   a. receiving, from the user device, a request message requesting that the custom search-space be provided;
   b. transmitting, to the user device, an assignment message assigning one or more resource elements to the custom search-space, each of the one or more resource elements comprising a particular subcarrier and a particular symbol time of a resource grid, respectively; and
   c. transmitting, to the user device, a downlink data message comprising a first message resource element, wherein the first message resource element is transmitted in the custom search-space;
   d. wherein the request for the custom search-space specifies whether an identification code of the user device is to be included in a downlink control information message, and whether the identification code of the user device is to be included in the downlink data message.

17. The method of claim 16, further comprising transmitting, to the user device, a downlink control information message before transmitting the downlink data message, the downlink control information message configured to indicate that the downlink data message will be transmitted thereafter.

18. The method of claim 16, further comprising transmitting, to the user device, concatenated with the downlink data message, an identification code of the user device and an indication of a size or length of the downlink data message.

* * * * *